(12) United States Patent
Ferrall et al.

(10) Patent No.: US 7,184,875 B2
(45) Date of Patent: Feb. 27, 2007

(54) HIGH TEMPERATURE PROTECTION OF HYBRID FUEL CELL SYSTEM COMBUSTOR AND OTHER COMPONENTS VIA WATER OR WATER VAPOR INJECTION

(75) Inventors: Joseph Francis Ferrall, Simi Valley, CA (US); Wolfgang Alan Fengler, Torrance, CA (US); James Daniel Powers, Santa Monica, CA (US); Pavel Alexandrovich Sokolov, Redondo Beach, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/288,393

(22) Filed: Nov. 29, 2005

(65) Prior Publication Data

US 2006/0127720 A1    Jun. 15, 2006

Related U.S. Application Data

(63) Continuation-in-part of application No. 11/010,257, filed on Dec. 14, 2004.

(51) Int. Cl.
*H01M 8/04* (2006.01)
*G06F 19/00* (2006.01)
*H01M 8/12* (2006.01)

(52) U.S. Cl. .................... 701/101; 429/20; 429/24
(58) Field of Classification Search ............ 701/101, 701/102, 105, 22; 429/13, 19, 22, 24, 26
See application file for complete search history.

(56) References Cited

U.S. PATENT DOCUMENTS

| | | | |
|---|---|---|---|
| 6,374,166 B1 * | 4/2002 | Takeda ..................... 701/22 |
| 6,432,568 B1 * | 8/2002 | Salvador et al. ............ 429/19 |
| 6,436,561 B1 * | 8/2002 | Hart-Predmore et al. .... 429/12 |

* cited by examiner

*Primary Examiner*—Hieu T. Vo
(74) *Attorney, Agent, or Firm*—Nixon & Vanderhye P.C.

(57) ABSTRACT

A system and method are disclosed for high temperature protection of combustor and other components by controlling the temperature of combustor gases in a hybrid fuel cell system combustor using a nozzle or plurality of nozzles to inject water or water vapor, downstream or directly into the combustor. A variable speed pump, actuated valve or other flow metering device regulates the supply of water to the nozzles and a steam generator. Flow regulation is effected by a control algorithm that reacts to combustor temperature, changes in the power production of the fuel cell system and/or other related system parameters.

27 Claims, 2 Drawing Sheets

HIGH TEMPERATURE PROTECTION OF HYBRID FUEL CELL SYSTEM COMBUSTOR AND OTHER COMPONENTS VIA WATER OR WATER VAPOR INJECTION

RELATED APPLICATIONS

This application is a continuation-in-part of application Ser. No. 11/010,257, filed Dec. 14, 2004, the entire contents of which are incorporated by reference in this application.

BACKGROUND OF THE INVENTION

The present invention is directed to fuel cell combustors, and, in particular, to a system and method for injecting water or water vapor into a hybrid fuel cell tail gas combustion chamber and other components to regulate combustion temperature.

Hybrid fuel cell systems often use a tail gas burner to combust excess stack reactants before they are admitted to a gas turbine. During some operating modes, reactant mixtures exist in quantities that can lead to excessively high temperatures in the burner and other equipment downstream of a fuel cell stack. These high temperatures can lead to long term system reliability degradation and even component or system failures.

One method of countering this problem has been to construct the combustion chamber from materials that are tolerant to the high temperatures that may occur. These materials are typically either special metal alloys, ceramics or some combination thereof. However, these materials are generally expensive and/or difficult to fabricate.

Another method of countering this problem has been to cool the vulnerable walls of the combustion chamber with a heat transfer fluid. This also complicates the construction of the burner and may decrease efficiency.

A third method of countering this problem has been to flow excess oxidant through the fuel cell system. This requires a larger oxidant pumping device, which increases system cost and decreases system efficiency, since the oxidant most used in fuel cell systems, i.e., air, is not a good heat transfer medium and gasses require more energy to move than do liquids.

BRIEF DESCRIPTION OF THE INVENTION

The present invention seeks to overcome the drawbacks of the prior methods of controlling the combustion chamber temperature in a fuel cell hybrid system tail gas burner by using a nozzle or plurality of nozzles to inject water or water vapor into the combustion chamber. The physical properties of water and water vapor provide superior heat transfer and heat absorption characteristics, compared to currently used cooling fluids. Water is readily available, and water or water vapor is often already in use in other fuel cell system components. Similar technology is in use in gas turbine engine combustion chambers for NOX control. Given the physical properties of water and water vapor, the devices of the present invention regulating injection of such water or water vapor require less energy than those for other fluids, which provides superior component protection without greatly impacting system efficiency.

The present invention consists of a water or water vapor source, a means of guiding the flow of the water or water vapor, a means of regulating the flow and/or pressure of the water or water vapor and a nozzle or plurality of nozzles to inject the water or water vapor either upstream, downstream or directly into the fuel cell hybrid system tail gas combustion chamber.

In one embodiment of the present invention, the nozzles provide a high degree of atomization for liquid water or a well-dispersed spray pattern for water vapor. A variable speed pump, actuated valve or other metering device regulates the supply of water or water vapor to the nozzles. For the case of water vapor, an evaporator is required between the pump and nozzles. A steam generator used for start-up would be used for this purpose. Flow regulation is effected by a control algorithm that reacts to combustor temperature, changes in the power production of the fuel cell system and/or other related system parameters. While the fuel cell system is producing electricity, the pump causes a nominal amount of water to flow in concert with the normal control functions of the fuel cell system to regulate combustor temperature. This negates the need to overcome the starting inertia of the pump, allowing the control system to react more quickly, should the water be needed to control a sudden temperature spike, without consuming significant amounts of water.

DETAILED DESCRIPTION OF THE INVENTION

Figure 1:
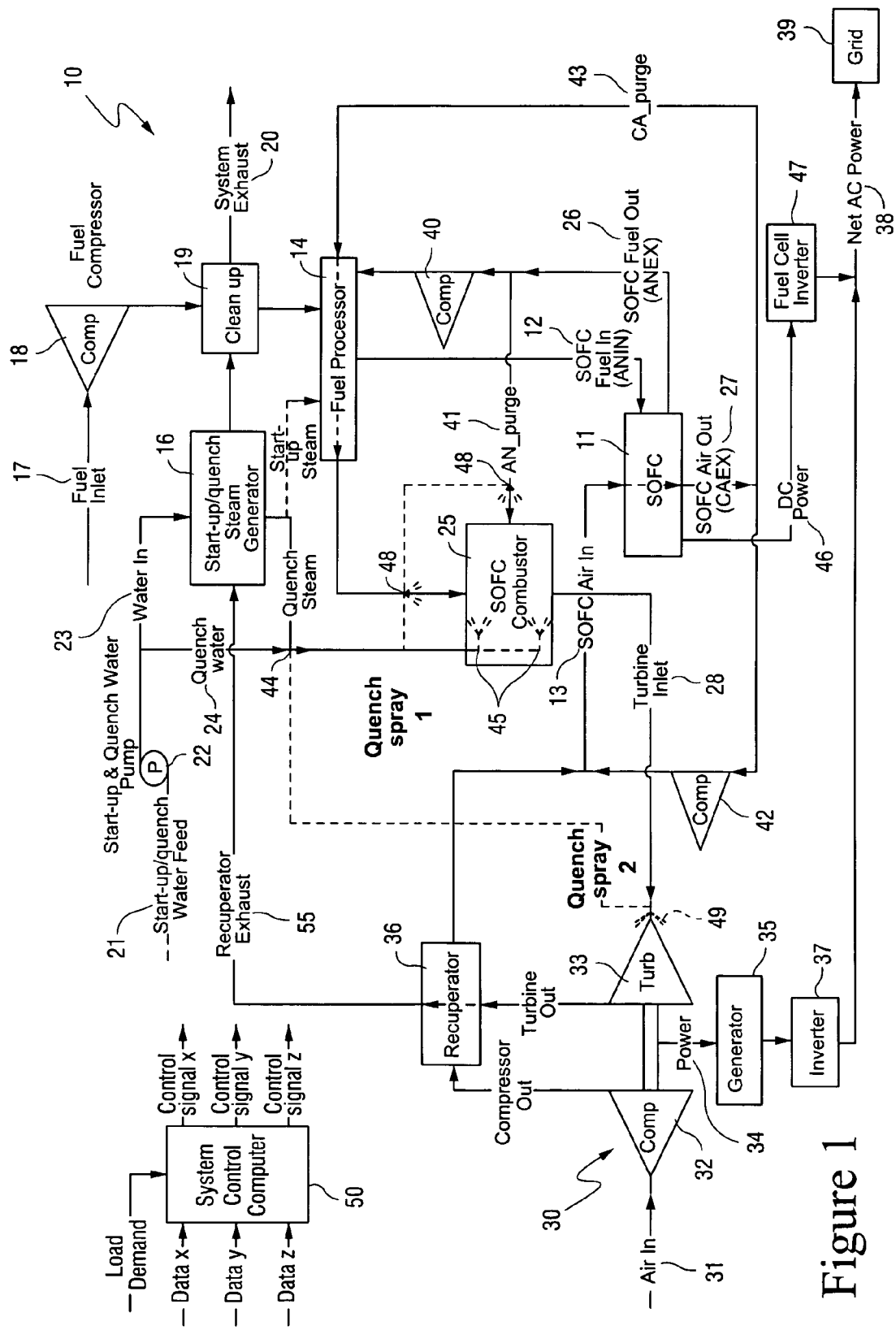
FIG. 1 is a process flow schematic of a sealed hybrid, high temperature solid oxide fuel cell system using the water quenching concept of the present invention.

FIG. 1 is an example of a process flow schematic of a sealed hybrid solid oxide fuel cell ("SOFC") combustor system 10 using the water or water vapor injection temperature control system and method of the present invention. System 10 includes a solid oxide fuel cell stack 11 into which fuel 12, designated as "Fuel In" ("ANIN"), and an oxidant, such as air 13, designated as "Air In" ("CAIN"), are inputted.

The fuel 12 inputted to stack 11 is reformed or purified by a fuel processor or steam reformer 14 using start-up steam 15 from a start-up/quench steam generator 16. The fuel, which is received through a fuel inlet 17, is first compressed by a fuel compressor 18, and then passed through a clean up system 19 that removes unwanted gases from the fuel prior to the fuel being inputted into fuel processor 14. For this purpose, fuel clean up system 19 uses steam from generator 16 that is exhausted from device 19 at system exhaust 20.

The steam generated by generator 16 is produced using water that is fed from start-up/quench water feed 21. The water from feed 21 is regulated by a metering device, which is preferably start-up and quench water pump 22 shown in FIG. 1. Preferably pump 22 is a variable speed pump; however, it should be noted that an actuated valve or other metering device can be used to regulate the supply of water. A first portion 23 of the water exiting metering device 22, designated as "water in", is piped to steam generator 16. A second portion 24 of the water exiting metering device 22, designated as "quench water", is piped directly to a solid oxide fuel cell combustor 25 to control the temperature in combustor 25, as discussed below.

The air 13 inputted to stack 11 is partly fresh air 31, designated as "air in", that has been compressed by a compressor 32 and then feed ("compressor out") to a recuperator 36 acting as a heat exchanger that passes exhaust heat ("turbine out") from a turbine 33 to the compressed air to heat it prior to being inputted to stack 11. In addition, exhaust heat from recuperator 36, designated "recuperator exhaust", is passed to generator 16 to help with the generation of steam. In the gas turbine arrangement 30 shown in FIG. 1, after fresh air 31 is compressed by compressor 32, combustion occurs at a constant pressure, and expansion over turbine 33 occurs back to the starting pressure to produce power 34 that rotates a generator 35. Generator 35 produces DC electrical power that is input to an inverter 37 to produce AC electrical power 38 that, in turn, is fed to a power grid 39.

Stack 11 exhausts excess stack reactants, which include an excess fuel stream 26 designated as "SOFC Fuel-Out" ("ANEX") and an air stream 27 designated as "SOFC Air-Out" ("CAEX"). A portion of the excess fuel stream 26 ANEX is compressed by compressor 40 and then recycled back to fuel processor 14. Another portion of the excess fuel stream 26, designated as "AN_purge" 41, is feed to excess fuel combustor 25. A portion of the air stream 27 CAEX is compressed by compressor 42 and then recycled directly back to stack 11. Another portion of the air stream 27, designated as "CA_purge" 43, is recycled back to fuel processor 14, after which it is feed to excess fuel combustor 25. The heat resulting from the operation of combustor 25 is then fed to the inlet of turbine 33 for use in the operation of the gas turbine system 30.

The excess stack reactants are a mixture of gases, including hydrogen, water vapor, carbon monoxide, carbon dioxide, nitrogen and methane. During some operating modes, reactant mixtures in stack 11 can exist in quantities that can lead to excessively high temperatures in combustor 25 and other equipment downstream of stack 11. These high temperatures can lead to long-term system reliability degradation and even component or system failures.

In the hybrid SOFC system 10 shown in FIG. 1, the temperatures of the exhaust gases 26 and 27 ("ANEX" and "CAEX") can be above 800° C. When the exhaust purge gases 41 and 43 ("AN_purge" and "CA_purge") then meet in the combustor 25, the adiabatic flame temperatures can exceed some materials limitations if the anode exhaust system ("AN purge") is rich in fuel. A good operating system will consume about 80% of the net fuel entering the stack 11; however, under upset, or transient conditions, the amount of fuel electrochemically utilized in the stack 11 can be lower, or even zero, resulting in a richer fuel to the combustor 25.

Stack 11 used in the hybrid system 10 shown in FIG. 1 is designed to seal the anode stream ANEX completely from the cathode stream CAEX at the exit of the fuel cell, thus enabling the recycling of anode and cathode gases 26 and 27, as shown in FIG. 1. The hybrid system 10, which requires a steam generating system 16 for start-up to supply steam for the fuel processor or steam reformer 14, will continue to operate steam generator 16 during normal operation at a very small water flow rate to steam generator 16. Steam, i.e., water vapor, generated at this low flow rate, designated as "quench" 44 continually enters the combustor 25, which would negate the need to overcome the starting inertia of the metering device 22, allowing system 10's control system (not shown) to react more quickly, should water be needed to control a sudden temperature spike in combustor 25 or other downstream components. Upon a signal from a system controller that high temperatures were experienced in combustor 25 or other downstream components, the water flow produced by metering device 22 would be increased to create more steam in quench 44 to enter the combustor 25 to reduce the temperature of combustor 25 and any downstream components. Also, as shown in phantom in FIG. 1, an additional quench nozzle could be placed directly at the inlet of turbine 33 to provide a quench spray directly to turbine 33 to reduce the temperature.

Figure 2:
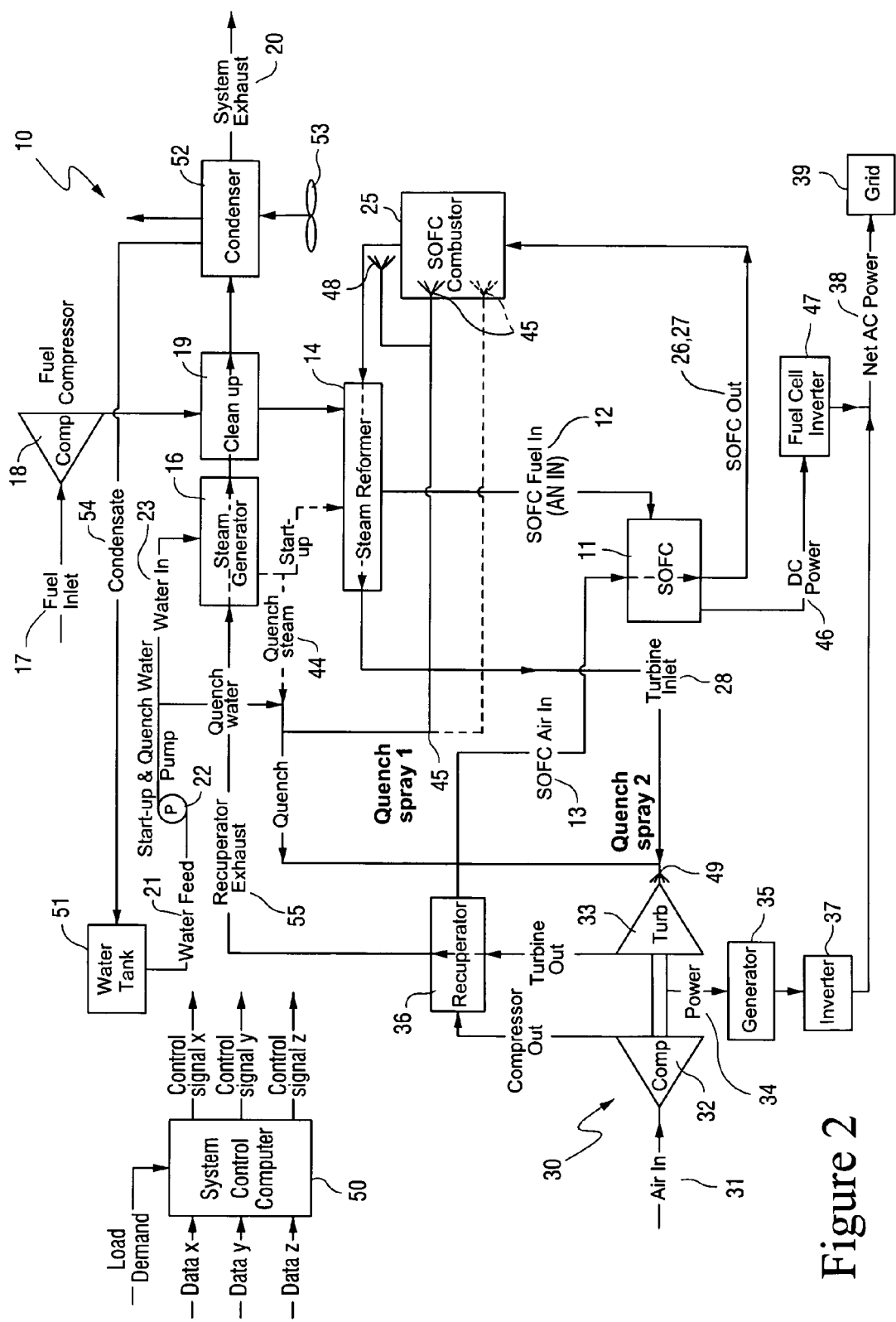
FIG. 2 is a process flow schematic of a seal-less hybrid, high temperature solid oxide fuel cell system using the water quenching concept of the present invention with an additional quench nozzle placed at a turbine inlet.

In the embodiment of the present invention, shown in FIG. 1, the source of quench water 24 and water-in 23 is water fed from start-up and quench water metering device 22, which regulates the supply of such water to at least one quench spray nozzle 45 located in combustor 25. It should be noted, however, that multiple nozzles 45 can be located in combustor 25. In addition, further additional nozzles 48 could be located upstream of combustor 25, as shown in FIGS. 1 and 2 of the present application. The operation of metering device 22 is controlled by a suitable control circuit, such as a computer 50 shown in FIG. 1, which uses a control algorithm to decide whether to have metering device 22 produce more or less water or water vapor to nozzles 45 to regulate the temperature of combustor 25. Preferably, the control algorithm reacts to combustion temperature, the power production of the fuel cell system 10 and/or other related system parameters to regulate the supply of quench spray to the nozzles 45.

Preferably, the control algorithm used in the system control circuit 50 includes feedforward and feedback inputs to modulate the water or water vapor flow, and thus, the temperature of combustor 25. The feedforward input uses a map, transfer function, neural network or similar logic structure to determine a flowrate setting based on any combination of the following data (as either actual monitored values or setpoints): load demand, combustor temperature, fuel utilization, air utilization, steam-to-carbon ratio, oxygen-to-carbon ratio, fuel flow rate, cathode air flow rate. Monitoring of these values is a function that is typically performed as part of the normal operation of a system, such as fuel cell system 10, and thus well known to persons of ordinary skill in the art.

The input data signals to System Control Computer 50, shown generally in FIG. 1 as "x", "y", and "z", can be signals providing data about system temperatures, pressures, flow rates, etc. Likewise, the control signals from System Control Computer 50, again shown generally in FIG. 1 as "x", "y", and "z", can be signals to valves, compressors, pumps, etc. The inputs to and outputs from System Control Computer 50 shown in FIG. 1 depict a typical SOFC system where, when power is being produced, there are inputs to the controller, which include a load demand and various system data from sensors that are used in algorithms in Computer 50 to send control signals that actuate a control action. In the present invention, the data normally collected is used by the control algorithm resident in System Control Computer 50 to control the quench water supply used by the present invention.

The most dangerous condition, in terms of combustor 25 exceeding its upper operating limits, is during a sudden loss of load event while the fuel cell system 10 is operating with a large load. A special algorithm for reacting to this condition is used in which the occurrence of this condition is monitored and the flow of water is quickly ramped up to prevent a temperature spike from the sudden in-rush of excess fuel that would result from this scenario. The feedback input uses the temperature downstream of combustor 25 through a proportional-integral-derivative ("PID") type controller to trim the flowrate based on a setpoint for the temperature of combustor 25. This temperature setpoint is scheduled based on the same kind of parameters identified above. The output is the sum of the feedback and feedforward inputs. The control system could also use either the feedforward or feedback inputs on their own, although the combined control strategy described above provides more optimal performance.

Stack 11 outputs DC electrical power 46, which is input to a fuel cell inverter 47 to produce AC electrical power 38 that is fed to power grid 39 that is also driven by generator 35 and inverter 37. While the fuel cell system 10 is producing electricity, metering device 22 typically produces a nominal amount of water flow in concert with the normal control functions of system 10 to regulate the temperature of combustor 25. This nominal flow of water negates the need to overcome starting inertia, allowing a control system to react more quickly, should water be needed to control a sudden temperature spike, as discussed above, without consuming significant amounts of water.

Thus, given the physical properties of water and water vapor, such as steam, which provide superior heat transfer and heat absorption characteristics, compared to air, the results achieved by injecting water or water vapor into a tail gas combustion chamber include the need for less energy than that needed for other fluids, while providing superior system component protection without greatly impacting system efficiency FIG. 2 shows a hybrid SOFC system where the SOFC stack 11 is designed such that the anode and cathode gases 26 and 27 at the exit of the fuel cell are not sealed from each other. Hence, recycling anode and cathode exit gases from stack 11 is not possible. However, the gases meet at the combustor 25 and, as with the sealed system, can create very high temperatures in an upset condition. By the same reasoning as noted above, a quench system could supply a means of protecting components from rapid temperature excursions. As shown in FIG. 2, an additional quench nozzle 45 could be placed within combustor 25. In addition, a nozzle 49 could also be located directly at the inlet to turbine 33 to provide a second quench spray directly to turbine 33, while further additional nozzles 48 could be located upstream of combustor 25, as shown in FIG. 2.

In the system shown in FIG. 2, the water feed 21 is connected to a tank of water 51, instead of, say, a municipal water supply. In this system, the steam exhausted from clean-up system 19 is not exhausted to the atmosphere, but rather fed to a condenser 52 that cools the steam using a fan device 53. The condensed water or condensate 54 is then piped back to tank 51 for recycling, so as to conserve water usage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for providing temperature protection in a hybrid fuel cell system combustor and/or other components, the system comprising:
   a source of water,
   a steam generator for converting water to a water vapor,
   at least one nozzle to inject the water or water vapor upstream and/or downstream of and/or directly into the combustor,
   a metering device for regulating the supply of the water to the at least one nozzle and steam generator,
   a computer and control algorithm for regulating the metering device and thereby, the supply of water to the at least one nozzle and steam generator.

2. The system of claim 1, wherein the control algorithm reacts to temperature in the combustion chamber to regulate the supply of water or water vapor to the at least one nozzle.

3. The system of claim 2, wherein the control algorithm includes feedforward and feedback inputs to modulate the water or water vapor flow, and thus, the temperature of the combustor.

4. The system of claim 3, wherein the feedforward input uses a logic structure selected from the group consisting of a map, a transfer function, and a neural network to set a flowrate for the water or water vapor flow.

5. The system of claim 4, wherein the flowrate setting based on at least one actual monitored value or setpoint selected from the group consisting of load demand, combustor temperature, fuel utilization, air utilization, steam-to-carbon ratio, oxygen-to-carbon ratio, fuel flow rate, and cathode air flow rate.

6. The system of claim 1, wherein the control algorithm reacts to the power production of the hybrid fuel cell system to regulate the supply of water or water vapor to the at least one nozzle.

7. The system according to claim 1, wherein the computer controls the metering device to produce a nominal amount of water flow in concert with normal control functions of the fuel cell system while the fuel cell system is producing electricity to thereby regulate combustor temperature.

8. The system of claim 1, wherein a second nozzle is located in the excess combustion reactants exhausted by the combustor, whereby the water or water vapor is injected downstream of the combustor at the entrance to a turbine into which the reactants exhausted by the combustor are inputted.

9. The system of claim 1, wherein a plurality of nozzles are used to inject the water or water vapor.

10. The system of claim 1, wherein the metering device is a device selected from the group consisting of a pump and an actuated valve.

11. The system of claim 1, wherein the water vapor is steam produced by the steam generator.

12. A system for providing temperature protection in a hybrid solid oxide fuel cell system combustor and/or other components, the system comprising:
   a source of water,
   means for generating steam to produce a water vapor,
   means for injecting the water or water vapor upstream and/or downstream of and/or directly into the combustor,
   means for guiding the flow of the water or water vapor to the injecting means,
   means for regulating the flow and/or pressure of the water or water vapor flowing to the injecting means, and
   control means for controlling the regulating means to thereby perform said regulation of the water or water vapor.

13. The system of claim 12, wherein the control means includes a control algorithm for controlling the regulating means.

14. The system of claim 13, wherein the control algorithm reacts to combustion temperature to regulate the supply of water or water vapor to the injecting means.

15. The system of claim 14, wherein the control algorithm reacts to the power production of the hybrid fuel cell system to regulate the supply of water or water vapor to the injecting means.

16. The system of claim 13, wherein the control algorithm includes feedforward and feedback inputs to modulate the water or water vapor flow, and thus, the temperature of the combustor.

17. The system of claim 16, wherein the feedforward input uses a logic structure selected from the group consisting of a map, a transfer function, and a neural network to set a flowrate for the water or water vapor flow.

18. The system of claim 17, wherein the flowrate setting based on at least one actual monitored value or setpoint selected from the group consisting of load demand, combustor temperature, fuel utilization, air utilization, steam-to-carbon ratio, oxygen-to-carbon ratio, fuel flow rate, and cathode air flow rate.

19. The system according to claim 12, wherein the control means controls the regulation means to produce a nominal amount of water flow in concert with normal control functions of the hybrid fuel cell system while the fuel cell system is producing electricity to regulate combustor temperature.

20. The system of claim 12, wherein the water vapor is steam produced by the steam generating means.

21. The system of claim 12, wherein the regulating means is a device selected from the group consisting of a pump and an actuated valve.

22. The system of claim 12, wherein the control means further controls the steam generator to control the flow of water vapor.

23. The system of claim 12, wherein the water vapor is steam.

24. A method for regulating combustion temperature in a fuel cell system tail gas burner comprising the steps of:
providing a source of water,
providing a steam generator for producing water vapor,
injecting the water or water vapor upstream and/or downstream of and/or directly into the combustor,
regulating the flow and/or pressure of the water or water vapor being injected using a control algorithm which includes feedforward and feedback inputs to modulate the water or water vapor flow, and thus, the temperature of the combustor.

25. The system of claim 24, wherein the feedforward input uses a logic structure selected from the group consisting of a map, a transfer function, and a neural network to set a flowrate for the water or water vapor flow.

26. The system of claim 25, wherein the flowrate setting based on at least one actual monitored value or setpoint selected from the group consisting of load demand, combustor temperature, fuel utilization, air utilization, steam-to-carbon ratio, oxygen-to-carbon ratio, fuel flow rate, and cathode air flow rate.

27. The method of claim 24, wherein the flow and/or pressure of the water or water vapor is regulated to produce a nominal amount of water flow in concert with normal control functions of the hybrid fuel cell system while the fuel cell system is producing electricity to regulate combustor temperature.

* * * * *